Patented Dec. 6, 1949

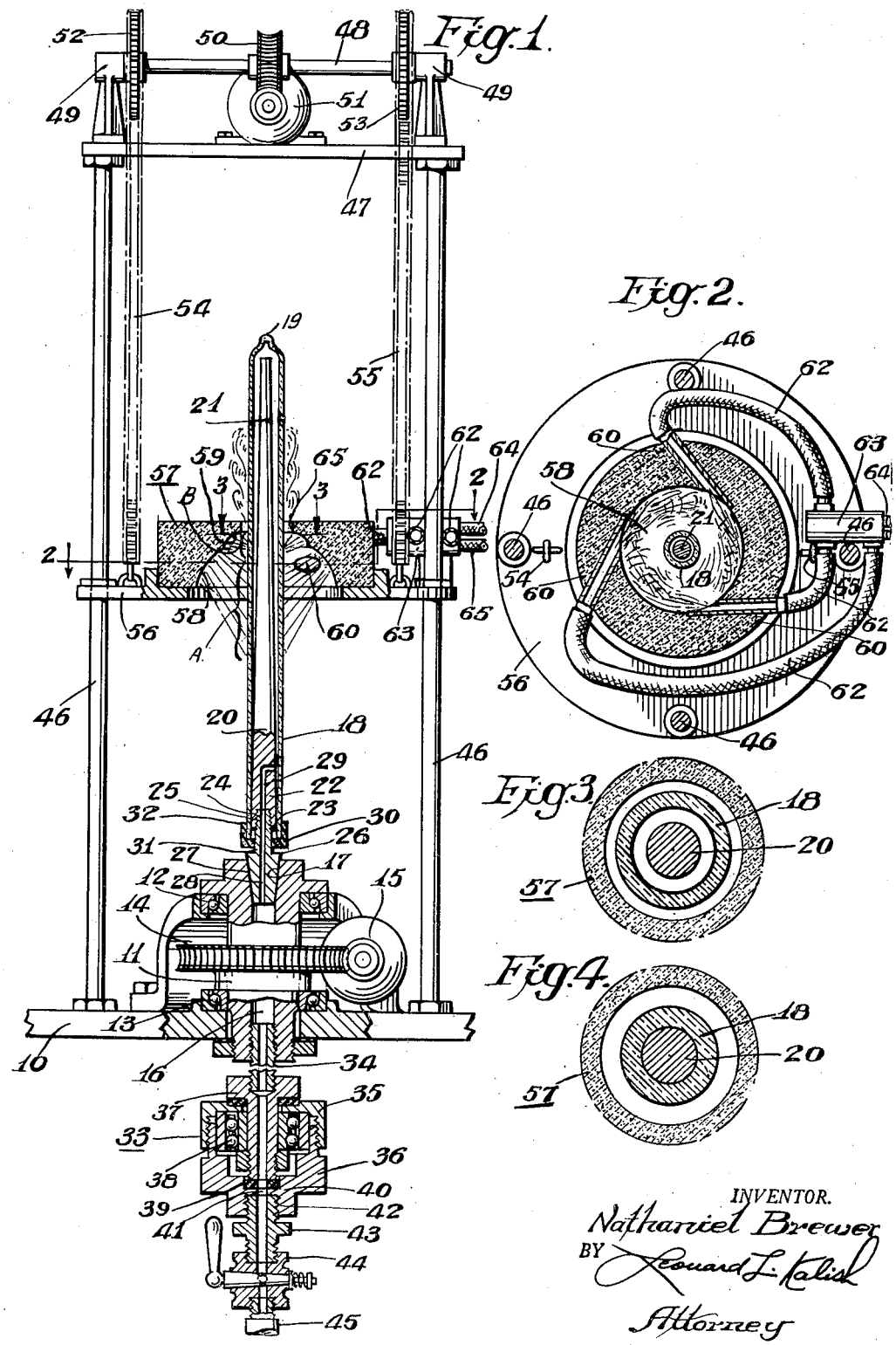

2,490,252

UNITED STATES PATENT OFFICE 2,490,252

APPARATUS FOR MAKING PRECISION-BORE TUBES AND OTHER PRODUCTS OF GLASS OR THE LIKE

Nathaniel Brewer, Newton, Pa., assignor to Fischer & Porter Company, Hatboro, Pa., a corporation of Pennsylvania Application February 5, 1944, Serial No. 521,184

6 Claims. (Cl. 49—7)

1

The present invention relates to a new and useful apparatus for making precision-bore tubing or the like of glass or other similar material.

An object of the present invention is to provide a new and useful apparatus for making glass, quartz, or like products containing a precision bore.

In the manufacture of scientific or precision glass, quartz, and other similar apparatus, need arises in certain situations for providing a tapered or a uniform-diametered elongated chamber or bore of great accuracy or precision within a body of glass, quartz, or other similar material.

Thus, for instance, in the manufacture of glass or other ceramic or the like rotameter tubes, or in the manufacture of burettes, pipettes, thermometer tubes, manometer tubes, capillary tubes, etc. of various scientific and medical instruments, a high degree of precision is desirable and indeed necessary in the bore of the tube or apparatus, whether such bore be a tapered bore or a parallel bore or a bore of any other predetermined internal shape.

By the apparatus of the present invention, precision-bores in glass, quartz, and other similar tubes and other products can be formed with such accuracy or precision and with such uniformity of result as to permit such precision tubes and apparatus to be mass-produced without any loss of accuracy or deterioration of quality and so as to permit the calibration of such bores by the application thereto of a predetermined standardized calibration which will become an accurate calibration for all of such mass-produced precision-bore tubes or apparatus for the reason that the successively produced tubes or apparatus will have their respective bores so identical that the calibration which will be suitable and appropriate for one will be equally suitable and appropriate for the others and, indeed, for all which may be formed to the same bore-size or bore-pattern.

A further object of the present invention is to provide apparatus whereby precision-bore tubes and apparatus may be produced of glass, quartz, or the like with a minimum breakage or loss due to internal strains in the finished product. Still another object of the present invention is to provide apparatus which will facilitate production and reduce the cost of production of such precision-bore tubes and apparatus.

With the above and other objects and advantages in view which will appear more fully from the following detailed description, appended claims and accompanying drawings, the present invention contemplates an apparatus whereby a glass (or quartz or other thermoplastic) tube is progressively conformed to an internal metallic mandrel having the exact predetermined size and shape (within the requisite tolerances allowable) by the progressive application of several stages of heat to the glass tube and the simultaneous application of a collapsing or conforming pressure to the tube, so that a preliminary heat-stage, as it moves along the tube, will gradually pre-heat the tube while a final higher heat-stage heats the tube to the collapsing or conforming temperature. The present invention also contemplates a heating apparatus wherein burning gases are introduced generally tangentially within an annular heating element surrounding the tube so that the tube is heated partly by convection and partly by radiation and without any appreciable direct contact of the flames with the tube itself.

For the purpose of illustrating the invention, there is shown in the accompanying drawings one form thereof which is at present preferred, since the same has been found in practice to give satisfactory and reliable results, although it is to be understood that the various instrumentalities of which the invention consists can be variously arranged and organized and that the invention is not limited to the precise arrangements and organizations of the instrunmentalities as herein shown and described.

Referring to the accompanying drawings in which like reference characters indicate like parts throughout:

Figure 1 represents a more or less schematic view partly in elevation and partly in cross-section of one embodiment of the present invention as it appears in use.

Figure 2 represents a horizontal cross-sectional view generally along the line 2—2 of Figure 1.

Figure 3 represents a horizontal cross-sectional view generally along the line 3—3 of Figure 1.

Figure 4 represents a cross-sectional view generally similar to that of Figure 3 but showing the appearance of parts after the glass tube has collapsed upon the mandrel.

In the embodiment of Figures 1 to 4, I may provide a table 10 upon which a vertical spindle 11 is rotatably mounted by means of upper and lower thrust bearings 12 and 13. The spindle 11 is provided with an external gear 14 which is operatively connected to a motor 15; the motor 15 being adapted to rotate the spindle 11 at relatively low more or less constant speed.

The spindle 11 is provided with an axial opening 16 therethrough and is provided at its upper end with a standard female Morse taper 17.

A generally cylindrical glass (or other thermoplastic) tube 18 which is to be given a tapered precision bore (so that it can be used, for example, as the metering tube of a rotameter) is sealed at one end as at 19 and is provided with an elongated internal mandrel 20. The mandrel 20 which is of stainless steel or other heat-resistant material has an external taper throughout most of its length; the taper being accurately formed by machining or other suitable operations to conform to the internal taper of the final glass tube.

As can be seen particularly from Figure 1, the mandrel 20 is adapted to extend coaxially within the glass tube 18 with its uppermost smaller free end 21 terminating just short of the sealed end 19 of the glass tube 18. The lowermost larger end 22 of the mandrel 20 terminates just short of the open end 23 of the glass tube 18.

The mandrel 20 may be tapered throughout its length or may have its larger end 22 cylindrical so as to aid in centering the mandrel 20 relative to the tube 18.

The larger end 22 of the mandrel 20 is provided with an internally-screw-threaded axially-extending socket 24 which is adapted removably to receive the externally screw-threaded end 25 of an adapter 26. The adapter 26 is provided with a standard male Morse taper 27 at its other end; the taper 27 of the adapter 26 fitting snugly within the taper 17 of the spindle 11, so that the mandrel 20 and the glass tube 18 are supported in axial alignment upon the spindle 11 and are adapted to be axially rotated thereupon.

The adapter 26 is provided with an axial opening 28 therethrough and a conduit 29 formed in the end 22 of the mandrel 20 is adapted to provide communication between the opening 28 of the adapter 26 and the interior of the glass tube 18.

A centrally-apertured sealing gasket 30 (which may be of suitable synthetic rubber or other similar flexible material capable of withstanding fairly high temperatures) is snugly fitted about the neck 31 of the adapter 26 and fits over the open end 23 of the tube 18; an outer annular flange 32 of said gasket 30 snugly closing the open end 23.

The spindle 11 is provided with means permitting evacuation of the glass tube 18 during rotation thereof. Said last-mentioned means includes a rotating pressure joint 33 which is disposed beneath the table 10 and which is connected to the lower end of the spindle 11 by means of a double-ended axially-apertured externally screw-threaded connector 34.

The rotating pressure joint 33 may be of any conventional construction (as for example that shown in United States Patent No. 2,107,405) and may include screw-threadedly connected housing elements 35 and 36. The rotating pressure joint 33 is provided with an axially-apertured rotating element 37 (to the outer end of which the connector 34 is screw-threadedly engaged). The element 37 is rotatably mounted upon balls 38 and terminates in close proximity to an apertured gasket 39 set in a stationary sealing element 40 formed in the housing element 36. A conduit 41 extends from the gasket 39 and communicates with an internally screw-threaded socket 42.

A suitable grade of grease is provided within the housing elements 35 and 36 of the rotating pressure joint 33 whereby a fluid-tight seal is maintained intermediate the rotating element 37 and the stationary sealing element 40.

A double ended axially-apertured screw-threaded connector 43 connects the socket 42 to one arm of a three-way stopcock 44, the other end of which is connected to a length of tubing 45 which leads to any suitable suction pump (not shown).

By suitably adjusting the stopcock 44, the rotatable plug thereof being provided with a conventional T-shaped bore, it is possible to evacuate the tube 18 during rotation thereof or to admit air to the tube through an opening (not shown) in the stopcock body, or to seal off the tube 18 from both the atmosphere and the suction pump.

The heating means will now be described.

Supported upon a plurality (as for example 4) of posts 46 extending upwardly from the table 10 is a platform 47. A shaft 48 has its ends journaled within bearings 49 mounted upon the platform 47. The shaft 48 is adapted to be rotated by means of a central gear 50 mounted thereon and operatively connected to a motor 51 which may also be mounted upon the platform 47.

The shaft 48 is provided with a pair of sprocket wheels 52 and 53 over which a pair of sprocket chains 54 and 55 pass.

The sprocket chains 54 and 55 support a frame 56 which is slidably mounted upon the posts 46. The frame 56 in turn carries a generally concave annular ceramic heating element 57.

As can be seen particularly in Figure 1, the heating element 57 includes a lowermost concave annular heating surface 58 which has only slight vertical curvature. An annular heating surface 59 is disposed above the lower heating surface 58. The heating surface 59 is somewhat smaller in horizontal dimension than the heating surface 58 and is generally parabolic in vertical configuration as can be seen particularly in Figure 1.

An uppermost annular generally cylindrical surface 65 extends from the top of the parabolic heating surface 59 to the upper surface of the heating element 57.

It is evident from Figure 1 that there is a relatively large annular clearance between the glass tube and the lowermost heating surface 58, and a somewhat smaller annular clearance between the glass tube and the parabolic heating surface 59 and a still smaller annular clearance between the glass tube and the uppermost cylindrical surface 65 of the heating element 57.

A plurality (for Example 3) of burner nozzles 60 extend through the wall of the heating element 57 somewhat above the lower edge thereof. As can be seen particularly in Figure 2, the nozzles 60 extend at an angle and are adapted to introduce burning gases generally tangentially along the surface 58 of the heating element 57. Lengths of tubing 62 connect the nozzles 60 to a mixing chamber 63 where illuminating gas (or hydrogen or acetylene or other combustible gas) and oxygen (or air) are mixed in proper proportions to form a combustible mixture; the gas and oxygen being introduced into the mixing chamber 63 from any suitable source (not shown) through the tubing 64 and 65 respectively.

The mixing chamber 63 may be mounted upon the frame 56 so that it is movable with the heating element 57.

It is evident that rotation of the sprocket wheels 52 and 53 will cause the frame 56 and the heating element 57 to move vertically upon the posts 46. The other ends of the chains 54 and 55 may be counter-weighted in any suitable manner (not shown).

The sprocket wheels 52 and 53 are adapted for opposite rotation so as either to raise or lower the frame 56 and heating element 57. This can be done either by making the motor 51 reversible (so that it can drive the sprocket wheels 52 and 53 in either direction) or in other ways known in the art.

The operation of the novel apparatus of the present invention will now be described.

Assuming that the mandrel 20 has been installed within the glass tube 18 and has been fitted with the adapter 26 and the sealing gasket 39, and assuming that the adapter has been mounted upon the spindle 11, the spindle 11 is started rotating, the burner nozzles 60 are lighted and the heating element 57 is moved slowly down along the length of the tube 18 and then moved back up again. This operation is merely for the purpose of giving the tube 18 a preliminary warming up. With the heating element 57 above the sealed end 19 of the glass tube 18, suction is then applied to the tube 18 (through the tubing 45, the stopcock 44, the connector 43, the rotating pressure joint 33, the connector 34, the opening 16, the opening 28 and the conduit 29), and the heating element 57 is gradually lowered along the length of the tube 18.

As the heating element 57 is lowered along the glass tube 18, it heats the tube primarily by radiation. Thus, the lowermost radiant heating surface 58 directs heat along an annular zone A of relatively large axial extent. This heating zone A is at relatively lower temperature since the heat is more or less widely disseminated, and serves as a pre-heating zone tending to raise the temperature of the glass tube to somewhat below the softening point of the glass.

The parabolic heating surface 59, on the other hand, tends to concentrate its heat upon an annular zone B of relatively small axial dimension.

Due to the greater concentration of heat by the parabolic heating surface 59 and due to the smaller annular clearance intermediate the parabolic heating surface 59 and the glass tube, the temperature in the zone B is appreciably higher than that in the heating zone A and, in fact, is sufficiently high to raise the temperature of the glass to the softening point so as to cause the glass in the zone B to collapse upon the mandrel under the influence of the differential pressure exerted thereon.

It is evident that, as the heating element 57 is moved downward along the glass tube, progressively lower portions of the glass tube are first pre-heated to a point somewhat below the softening point, and are then raised to the softening point and collapsed upon the mandrel. That is, Figure 3 shows the appearance of the parts along the heating zone B before the glass tube has collapsed upon the mandrel while Figure 4 shows the appearance after the glass tube has collapsed upon the mandrel.

The uppermost cylindrical surface 65 permits the hot gases of combustion to escape and rise along the glass tube as shown in Figure 1. In this way, the hot combustion gases keep the collapsed glass tube from cooling off too rapidly and thus serve to anneal the glass tube and to minimize the development of internal stresses therein.

The uppermost cylindrical surface 65, which is at a somewhat lower temperature than the parabolic heating surface 59 due to the fact that it is further removed from the heating nozzles 60, also serves to provide an annealing zone for the collapsed glass tube.

The rate of descent of the heating element 57 is preferably so adjusted that the element 57 can be lowered at a steady uninterrupted rate so as progressively to collapse the softened tube 18 upon the mandrel 20.

In this way, when the heating element 57 has reached its lowermost position, the tube 18 will have been conformed to the shape of the mandrel (except for the extreme ends of the tube 18 which are cut off in making the final metering tube).

If desired, the heating element 57 can then be moved gradually upward along the collapsed tube 18 in order further to anneal the tube, although it is possible further to anneal the collapsed tube by any conventional annealing operation.

After the tube 18 has been collapsed upon the mandrel 20 and the heating element 57 has been raised to its initial uppermost position, the stopcock 44 is turned to admit air to the mandrel, the mandrel is removed from the spindle 11 and the collapsed tube is slipped off the mandrel and is ready for use after the extreme ends thereof have been cut off.

The novel apparatus of the present invention is preferable to conventional apparatus heretofore employed in that heating of the glass tube in large part by radiation minimizes stresses and strains in the glass and gives a stronger final product. Furthermore, by eliminating direct contact of the burning gases with the glass tube, "hot spots" are eliminated which gives a more uniform final product and which also prevents overheating of the mandrel and thus greatly lengthens the life of the mandrel.

Another advantage of the present apparatus is that the surface of the formed glass is cleaner than in conventional operations wherein the glass tube is heated by direct heat, that is by impingement of the flame directly on the glass, because in such direct heating, the flame frequently carries particles of dust, rust and other foreign matter which, when driven against the softened tube, will adhere to the surface of the tube and thus produce blemishes. According to the present apparatus, on the other hand, the dust, rust and other foreign matter is kept out of direct contact with the glass tube and the surface of the finally formed glass is relatively free from such blemishes.

Furthermore, the continuous application of pre-heating, softening and annealing heat-stages and the uniformly progressive collapsing of the glass tube upon the mandrel give a product which is greatly superior to that produced by conventional methods heretofore employed.

That is, according to the present invention, it is possible to produce extremely accurate precision bore tubes according to the principles of "mass production" since each tube formed on a given mandrel will have exactly the same bore as every other tube formed on the same mandrel and will utilize exactly the same calibration and, if broken, can be replaced by another tube without re-calibration or adjustment of the rotameter.

While, for purposes of illustration, I have described the forming of a tube having a tapered or conical inner bore, it is within the scope of the present invention to construct tubes with cylindrical or other bores by simply replacing the tapered mandrel with a cylindrical or other shaped mandrel corresponding to the desired inner bore of the final glass tube. In this way, it is possible to form burettes, pipettes, and various other types of medical and laboratory equipment of accurate and pre-determined configuration.

The present invention may be embodied in other specific forms without departing from the spirit or essential attributes thereof, and it is therefore desired that the present embodiment be considered in all respects as illustrative and not restrictive, reference being had to the appended claims rather than to the foregoing description to indicate the scope of the invention.

Having thus described my invention, what I claim as new and desire to protect by Letters Patent is:

1. For use in heat-treating tubing or the like, an annular heating element adapted for up-and-down movement relative to the work being treated, said heating element comprising a concave annular radiant heating surface adapted to provide a preheating zone, a smaller generally parabolic annular heating surface spaced vertically from said first-mentioned heating surface and adapted to provide a high-temperature annular softening zone, and means for directing burning gases tangentially against said first-mentioned heating surface.

2. For use in heat-treating tubing or the like, a vertical frame, a carriage movably mounted on said frame, driving means for raising and lowering said carriage, and an annular heating element supported on said carriage and movable therewith, said heating element comprising a concave annular heating surface adapted to provide a preheating zone, a smaller generally parabolic annular heating surface spaced vertically from said first-mentioned heating surface and adapted to provide a high-temperature annular softening zone, and means for directing burning gases tangentially against said first-mentioned heating surface.

3. For use in heat-treating tubing or the like, a base, a vertically disposed spindle rotatably mounted on said base, a motor mounted adjacent said spindle and adapted to rotate it, means for applying suction to said spindle during rotation thereof for evacuating a tube of glass or the like mounted on said spindle, a plurality of vertical guide-rods extending upward from said base, a carriage movably mounted on said guide-rods, driving means for raising and lowering said carriage, and an annular heating element supported on said carriage and movable therewith, said heating element comprising a concave annular heating surface and means for directing burning gases tangentially against said concave surface.

4. For use in heat-treating tubing or the like, an annular heating element constructed and arranged for up-and-down movement relative to the work being treated, said heating element comprising a concave generally cup-shaped radiant heating surface having a large opening at its lower edge and having a small opening at its upper edge providing a relatively small annular clearance with the work, and a plurality of circumferentially distributed nozzles extending generally horizontally through said heating element and communicating, at their inner ends, with said heating surface generally intermediate the upper and lower edges thereof, said nozzles being constructed and arranged to direct burning gases tangentially along the heating surface.

5. For use in heat-treating tubing or the like, a vertical frame, a carriage movably mounted on said frame, driving means for raising and lowering said carriage, and an annular heating element supported on said carriage and movable therewith, said heating element comprising a concave generally cup-shaped radiant heating surface having a large opening at its lower edge and having a small opening at its upper edge providing a relatively small annular clearance with the work, and a plurality of circumferentially distributed nozzles extending generally horizontally through said heating element and communicating, at their inner ends, with said heating surface generally intermediate the upper and lower edges thereof, said nozzles being constructed and arranged to direct burning gases tangentially along the heating surface.

6. For use in heat-treating tubing or the like, a base, a vertically disposed spindle rotatably mounted on said base, a motor mounted adjacent said spindle and adapted to rotate it, means for applying suction to said spindle during rotation thereof for evacuating a tube of glass or the like mounted on said spindle, a plurality of vertical guide-rods extending upward from said base, a carriage movably mounted on said guide-rods, driving means for raising and lowering said carriage, and an annular heating element supported on said carriage and movable therewith, said heating element comprising a concave generally cup-shaped radiant heating surface having a large opening at its lower edge and having a small opening at its upper edge providing a relatively small annular clearance with the work, and a plurality of circumferentially distributed nozzles extending generally horizontally through said heating element and communicating, at their inner ends, with said heating surface generally intermediate the upper and lower edges thereof, said nozzles being constructed and arranged to direct burning gases tangentially along the heating surface.

NATHANIEL BREWER.

REFERENCES CITED

The following references are of record in the file of this patent:

UNITED STATES PATENTS

| Number | Name | Date |
|---|---|---|
| 786,259 | Bournique | Apr. 4, 1905 |
| 790,265 | Sassman | May 16, 1905 |
| 911,373 | Brinkman | Feb. 2, 1909 |
| 1,301,714 | Keuppers | Apr. 22, 1919 |
| 1,446,026 | Wetmore | Feb. 20, 1923 |
| 2,254,306 | Mott et al. | Sept. 2, 1941 |
| 2,286,401 | Everett | June 16, 1942 |